July 23, 1935.  O. C. BROWN  2,009,338
TIRE TOOL
Filed July 24, 1934
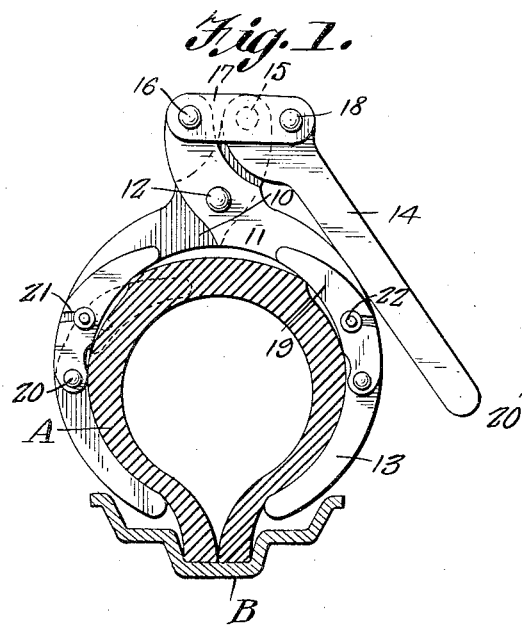
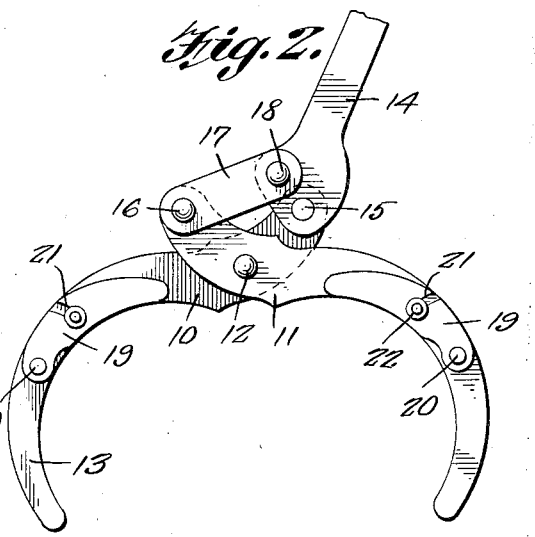
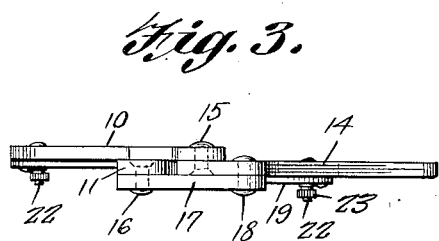
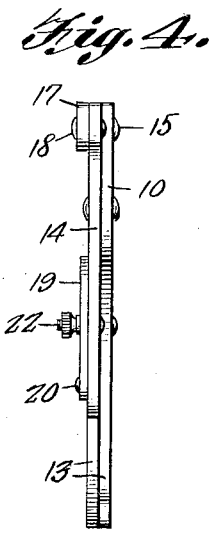
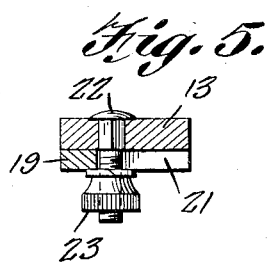
Orville C. Brown,
INVENTOR Patented July 23, 1935

2,009,338

UNITED STATES PATENT OFFICE 2,009,338

TIRE TOOL

Orville C. Brown, Cuba, Ohio

Application July 24, 1934, Serial No. 736,743

1 Claim. (Cl. 157—6)

The invention relates to a tool and more especially to a tire tool.

The primary object of the invention is the provision of a tool of this character, wherein the shoe of a pneumatic tire can be clamped for the bringing together of the open side of said shoe to permit the easy removal of the shoe from a rim and also the placing of the shoe upon the latter.

Another object of the invention is the provision of a tool of this character, wherein the clamping jaws are supplemented by auxiliary jaws for the successful removal of a shoe or casing of a pneumatic tire from a rim, or the applying of said shoe thereto without undue exertion on the part of the user of the tool.

A further object of the invention is the provision of a tool of this character which is extremely simple in construction, thoroughly reliable and efficient in its purpose, novel in form, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a vertical transverse sectional view through a pneumatic tire shoe or casing showing the tool constructed in accordance with the invention applied thereto for the removal of the shoe or casing from the rim.

Figure 2 is an elevation of the tool with the jaws in open position.

Figure 3 is a top plan view.

Figure 4 is a side elevation.

Figure 5 is an enlarged transverse sectional view.

Similar reference characters indicate corresponding parts throughout the several views in the drawing.

Referring to the drawing in detail, A designates a shoe or casing of a pneumatic tire and B a rim of a wheel on which the tire is demountable, these parts being shown merely to illustrate the application and the manner of use of the tool embodying the present invention and hereinafter fully described.

The tool comprises a pair of levers 10 and 11, respectively, arranged in crossed relation to each other and swingingly connected one to the other by a pivot 12. These levers 10 and 11 are formed with arcuate-shaped clamping jaws 13 to embrace the shoe or casing A exteriorly thereof so as to bring together the edges of the said shoe or casing at the open side thereof for the removal of the tire from the rim B or the application of said tire thereto.

Swingingly connected to one of the levers, preferably the lever 10, is a handle 14, the pivot 15 being for swingingly connecting the handle 14 with said lever. Swingingly connected to the other lever 11 by a pivot 16 is a link 17, the same being also pivoted, at 18, eccentrically to the handle 14 at one side of the pivotal mounting 15 of said handle. It will be obvious that when the handle is swung in one direction the clamping jaws 13 are brought toward each other under the action of the link 17 and said handle. On the swinging of the handle 14 in the reverse direction, the jaws 13 are spread apart, the application of the tool being clearly illustrated in Figure 1 of the drawing.

Pivotally carried by the jaws 13 are auxiliary clamping jaws 19, each supported upon the pivot 20 engaged in the companion jaws. These auxiliary jaws 19 are provided with the slots 21 opening through the outer edges thereof and accommodating binding bolts 22 carried by the jaws 13, each bolt 22 being fitted with a knurled nut 23. These jaws 19 swing on the pivots 20 for movement inwardly of the jaws 13 and the range of swing inwardly of the said jaws 13 will be limited to the extent of the slot 21 engaged by the binding bolts 22. Thus it will be seen that the jaws 19 can be adjusted and made fast in such adjusted position by the bolt 22 for action upon the shoe or casing A of the tire for the purposes presently described. The purpose of the jaws 19 and the adjustment thereof is to have the tool operate upon tires or shoes of small diameter so that the jaws 13 of the tool will cause the edges of the said shoe or casing at its open side to be brought together either for the mounting of the shoe or casing upon a rim or the demounting of such shoe or casing therefrom. Further these jaws 19 act against the tread of the shoe or casing to hold the same when operating the tool from becoming pinched by the jaws 13 at their pivotal connection with each other.

The handle and link action of the tool requires minimum leverage in the working of the tool for the purposes stated.

It will be noted that when the handle 14 has been swung in a direction for the closing of the jaws 13 the latter will remain in closed position because the center of the pivot 18 is slightly below the center of the pivots 16 and 18 and thus the jaws will be prevented from accidental opening movement.

What is claimed is:

A tool of the character described comprising a pair of crossed levers pivotally connected together, arcuate jaws formed on said levers and outwardly arched reversely to each other, a handle pivoted to one lever, a link pivoted to the other lever and eccentrically pivoted to the handle, and adjustable auxiliary jaws pivotally carried by the first-named jaws considerably removed from the free ends of the latter and with the free ends of said auxiliary jaws being directed towards the pivotal connection of the levers and movable inwardly with respect to said first named jaws.

ORVILLE C. BROWN.